United States Patent
Kobayashi et al.

[11] Patent Number: 5,934,417
[45] Date of Patent: Aug. 10, 1999

[54] DISC BRAKE RETURN SPRING

[75] Inventors: Kinzo Kobayashi; Shinji Suzuki, both of Yamanashi-ken; Kazuhiro Doi; Tadashi Tamasho, both of Kanagawa-ken, all of Japan

[73] Assignees: Tokica, Ltd., Kawasaki; Nissan Motor Co., Ltd., Yokohama, both of Japan

[21] Appl. No.: 08/887,645

[22] Filed: Jul. 3, 1997

[30] Foreign Application Priority Data

Jul. 9, 1996 [JP] Japan .................................... 8-198388

[51] Int. Cl.⁶ .................................................. F16D 55/22
[52] U.S. Cl. .................................. 188/72.3; 188/1.11 W; 188/73.38
[58] Field of Search ........................... 188/1.11 W, 73.38, 188/73.45, 73.35, 73.36, 73.37, 72.3

[56] References Cited

U.S. PATENT DOCUMENTS

| | | | |
|---|---|---|---|
| 4,245,723 | 1/1981 | Moriya | 188/72.3 |
| 4,364,455 | 12/1982 | Oshima | 188/1.11 |
| 4,441,588 | 4/1984 | Saito | 188/73.38 |
| 5,249,647 | 10/1993 | Kobayashi et al. | 188/72.3 |
| 5,687,817 | 11/1997 | Kobayashi et al. | |

*Primary Examiner*—Matthew C. Graham
*Assistant Examiner*—Melanie Torres
*Attorney, Agent, or Firm*—Wenderoth, Lind & Ponack, L.L.P.

[57] ABSTRACT

A pair of arms have opposite bearing portions between which disc-passing regions are defined. Each of the disc-passing regions has a centerline offset outwardly from the centerline of a disc. A pair of pad springs have respective engagement regions engaged with the disc-passing regions. By this arrangement, a pair of inboard and outboard return springs are laterally symmetrical with respect to the centerline of the disc-passing region or pad spring. The return springs are deformed to cause their free ends or bias portions to be resiliently contacted with the inner surface of bent portions of wear warning elements. This enables the amount of deformation of the outboard return springs to be greater than the amount of deformation of the inboard return springs. Thus, the outboard return springs exert a force greater than that of the inboard return springs.

6 Claims, 7 Drawing Sheets

Fig. 4(a)
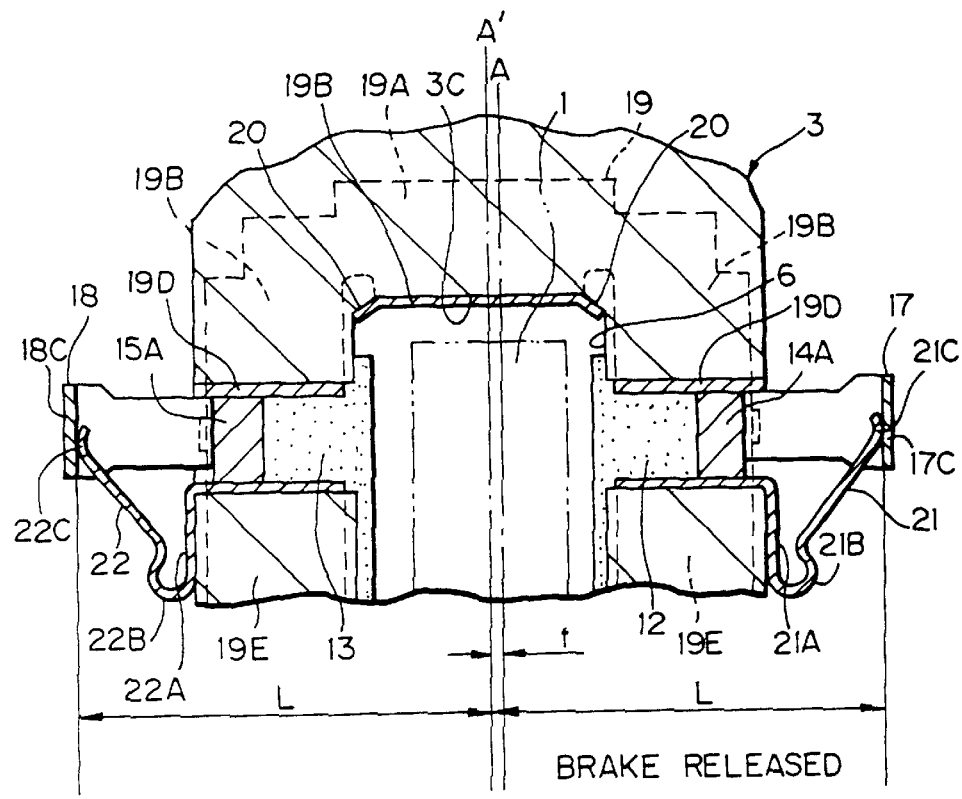
BRAKE RELEASED
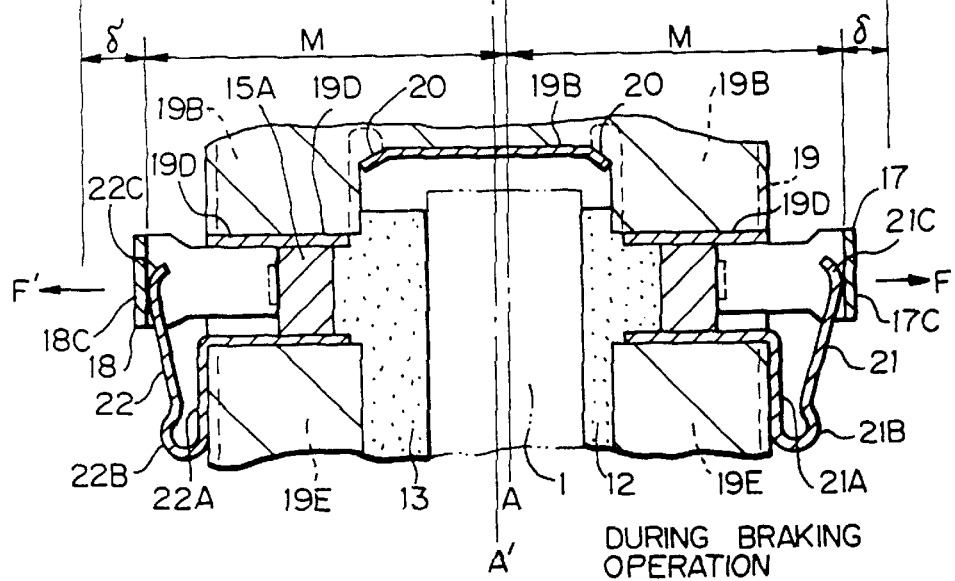
DURING BRAKING OPERATION
Fig. 4(b)

DISC BRAKE RETURN SPRING

BACKGROUND OF THE INVENTION

The present invention relates to a disc brake suitable for use in an automotive vehicle and operable to apply a braking force thereto.

A known disc brake typically comprises an anchor or carrier including a pair of axial arms spaced along the circumference of and extending over the outer periphery of a disc and having respective disc-passing regions, a caliper slidably supported on the arms and configured to straddle the disc between the arms, a pair of inboard and outboard friction pads urged into frictional engagement with opposite sides of the disc when a piston is moved in the cylinder of the caliper, and a pair of return springs adapted to constantly urge the inboard and outboard friction pads in directions away from the disc.

When the brake is actuated, hydraulic fluid is forced into the cylinder of the caliper to cause the piston to move toward the disc. Also, the entire caliper is inwardly slid or displaced relative to the carrier. The outer leg of the caliper and the piston then coact to urge the inboard and outboard friction pads into frictional engagement with opposite sides of the disc so as to apply a braking force thereto.

When the brake is released to stop feeding of the hydraulic fluid, the piston is moved back into the cylinder. At this time, the inboard and outboard return springs act to urge the inboard and outboard friction pads in directions away from the disc.

Typically, a piston seal is disposed between the cylinder and the piston and made of rubber or similar material. When the brake is released, the piston is returned to the cylinder due to springback of the piston seal. As such, the inboard return springs are free to urge the inboard friction pad in a direction away from the disc without receiving a substantial amount of resistance from the piston. The outboard return springs in turn urge the outboard friction pad in a direction away from the disc while the entire caliper is outwardly moved relative to the piston under the influence of the piston seal.

As previously mentioned, the piston is moved back into the cylinder under the influence of the piston seal when the brake is released. During this movement, the inboard friction pad is moved relative to the caliper. That is, the inboard friction pad is moved toward the inboard leg of the caliper under the action of the inboard return springs without receiving a substantial amount of resistance from the piston. Thus, the inboard friction pad can readily be separated from the disc.

The outboard friction pad is, in turn, urged against the outboard leg of the caliper merely under the action of the outboard return springs. Therefore, the outboard friction pad can not be separated from the disc during movement of the piston unless the entire caliper is outwardly moved relative to the carrier.

Where the entire caliper is not sufficiently outwardly moved relative to the carrier, the outboard friction pad remains in sliding contact with the disc. This results in what is referred to in the art as "drag" of the brake. Such drag brings about a deterioration in fuel economy and leads to immature wear of the friction pad.

To safely separate the outboard friction pad from the disc, attempts may be made to change the shape of the outboard return springs so that the amount of a force applied from the outboard return springs to the outboard friction pad is greater than the amount of a force applied from the inboard return springs to the inboard friction pad. However, this change in shape results in an increase in the number of required parts and the number of steps of mounting the return springs during assembly and also, makes it difficult to properly mount the inboard and outboard return springs.

In view of the foregoing, it is an object of the present invention to provide a disc brake which enables ready separation of both inboard and outboard friction pads from a disc, which effectively prevents the occurrence of "drag", and which allows for the use of identical inboard and outboard return springs and thus facilitates mounting of the return springs.

SUMMARY OF THE INVENTION

According to the present invention, there is provided a disc brake comprising a carrier including a pair of axial arms spaced along the circumference of and extending over the outer periphery of a disc and having respective disc-passing regions, a caliper slidably supported on the arms and configured to straddle the disc between the arms, a pair of inboard and outboard friction pads urged into frictional engagement with opposite sides of the disc when a piston is moved in the cylinder of the caliper, and a pair of return springs adapted to constantly urge the inboard and outboard friction pads in directions away from the disc.

As a feature of the present invention, the disc-passing regions are axially outwardly offset by a predetermined distance from the disc so that the outboard return springs exert on the outboard friction pad a first force which is greater than a second force applied from the inboard return springs to the inboard friction pad.

More specifically, the amount of deformation of the outboard return springs is greater than the amount of deformation of the inboard return springs when the inboard and outboard friction pads are urged into frictional engagement with opposite sides of the disc against the action of the inboard and outboard return springs during braking. The difference in the amount of deformation corresponds to the amount of offset of the arms from the disc and allows the amount of a force applied to the outboard return springs to the outboard friction pad to become greater than the amount of a force applied from the inboard return springs to the inboard friction pad when the brake is released. This difference in force insures separation of the both inboard and outboard friction pads from the disc.

BRIEF DESCRIPTION OF THE DRAWINGS

The present invention will now be described, by way of example, with reference to the accompanying drawings, in which:

FIG. 4 is an enlarged sectional view taken on the line IV—IV of FIG. 1, wherein section (a) illustrates the operation of inboard and outboard friction pads, pad springs, wear warning elements, return springs and other elements when the brake is unactuated; and section (b) is a view similar to that of section (a), but showing the operation of the disc brake when the brake is actuated;

DESCRIPTION OF THE PREFERRED EMBODIMENTS

FIGS. 1 to 5 illustrate a disc brake assembled according to a first embodiment of the present invention.

Figure 1:
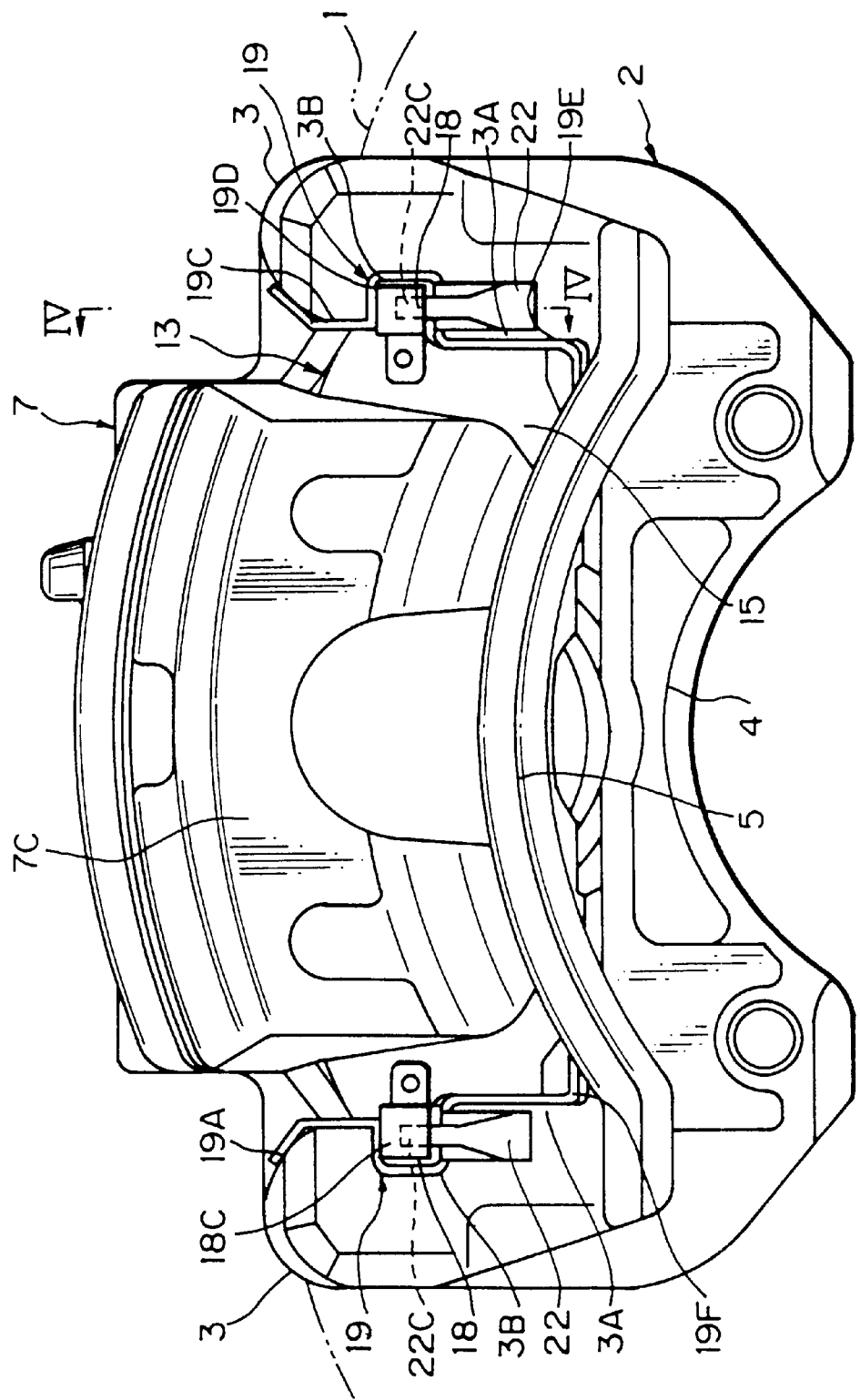
FIG. 1 is a front view of a disc brake assembled according to a first embodiment of the present invention.
Figure 2:
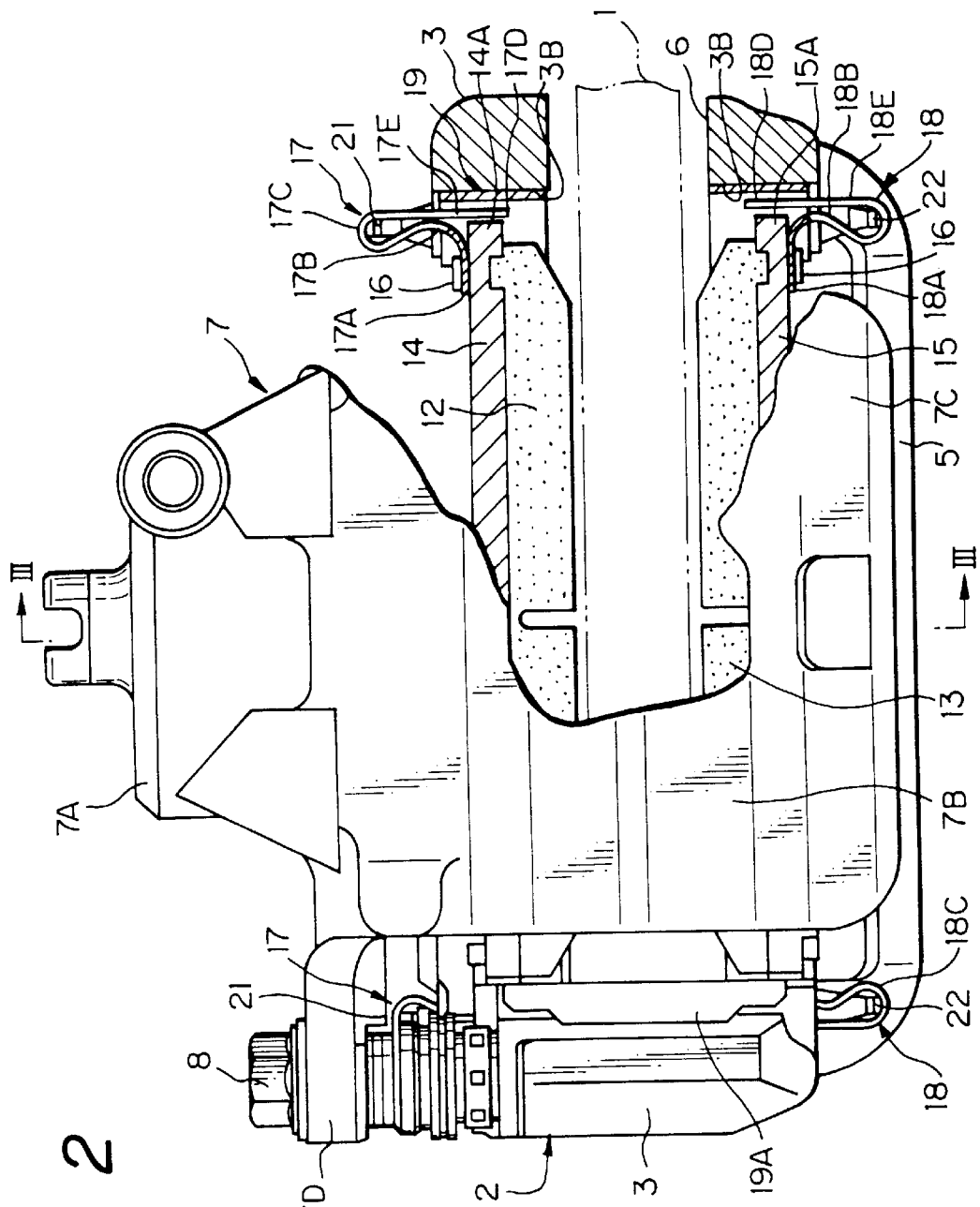
FIG. 2 is a top plan view, partly broken away, of the disc brake shown in FIG. 1.

Referring first to FIGS. 1 and 2, a disc 1 is rotated with a corresponding wheel (not shown) of an automotive vehicle. An anchor or carrier 2 is secured to a fixed part of the vehicle which is located at the inboard side of the disc 1. The carrier 2 includes a pair of axial arms 3, 3 spaced along the circumference of and extending over the outer periphery of the disc 1, a bridge portion 4 extending between the proximal ends of the arms 3, 3, and a sectorial reinforcing beam 5 extending between the distal ends of the arms 3, 3.

Formed at the proximal (inboard) and distal (outboard) ends of each of the arms 3, 3 are a pair of radially inwardly extending bearing portions 3A, 3A, and a pair of opposite pad guides 3B, 3B having a generally C-shaped section and adapted to cooperate with a corresponding pair of pad springs 19, 19 so as to slidably guide a pair of inboard and outboard friction pads 12, 13 along the axis of the disc 1.

As shown in FIGS. 1 and 4, each of the arms 3 has a disc-passing region 6 defined between the bearing portions 3A, 3A and configured to allow the disc 1 to rotate below the arm 3. The disc-passing region 6 extends, by a short distance, along the outer periphery of the disc 1 and has a C-shaped transverse section.

As shown in FIG. 4, the disc 1 has a centerline A—A. The disc-passing region 6 has a centerline A'—A' which is axially outwardly offset, by a given distance t, from the centerline A—A of the disc 1. The disc 1 is thus positioned closer to the inboard friction pad 12 than the outboard friction pad 13. The distance t is preferably in the range of 0.5 to 3.0 mm, but any value more than 0.3 mm is acceptable.

A caliper 7 is slidably supported by the carrier 2. The caliper 7 includes an inboard leg 7A located at the inboard side of the disc 1 and containing a cylinder 9 which will be described later, a bridge portion 7B extending over the outer periphery of the disc 1 and located between the arms 3, 3 of the carrier 2, a fork-shaped outboard leg 7C extending substantially parallel to the inboard leg 7A and depending from the outboard or front end of the bridge portion 7B, and a pair of flanges 7D, 7D (only one is shown in FIG. 2) extending outwardly from opposite ends of the inboard leg 7A.

Slide pins (not shown) have one end secured to the flanges 7D, 7D of the caliper 7 by bolts 8, 8 and the other end slidably fit into corresponding holes (not shown) which are formed in the arms 3, 3. This arrangement enables the caliper 7 to be axially slid relative to the carrier 2.

The cylinder 9 is formed in the inboard leg 7A. A cylindrical piston 10 is slidably disposed within the cylinder 9. When hydraulic fluid is forced into the cylinder 9, the piston 10 is moved in the cylinder 9 to cause the caliper 7 to move or slide toward the inboard side of the disc 1. The piston 10 then coacts with the outboard leg 7C so as to urge the inboard friction pad 12 and the outboard friction pad 13 into frictional engagement with opposite sides of the disc 1.

Figure 3:
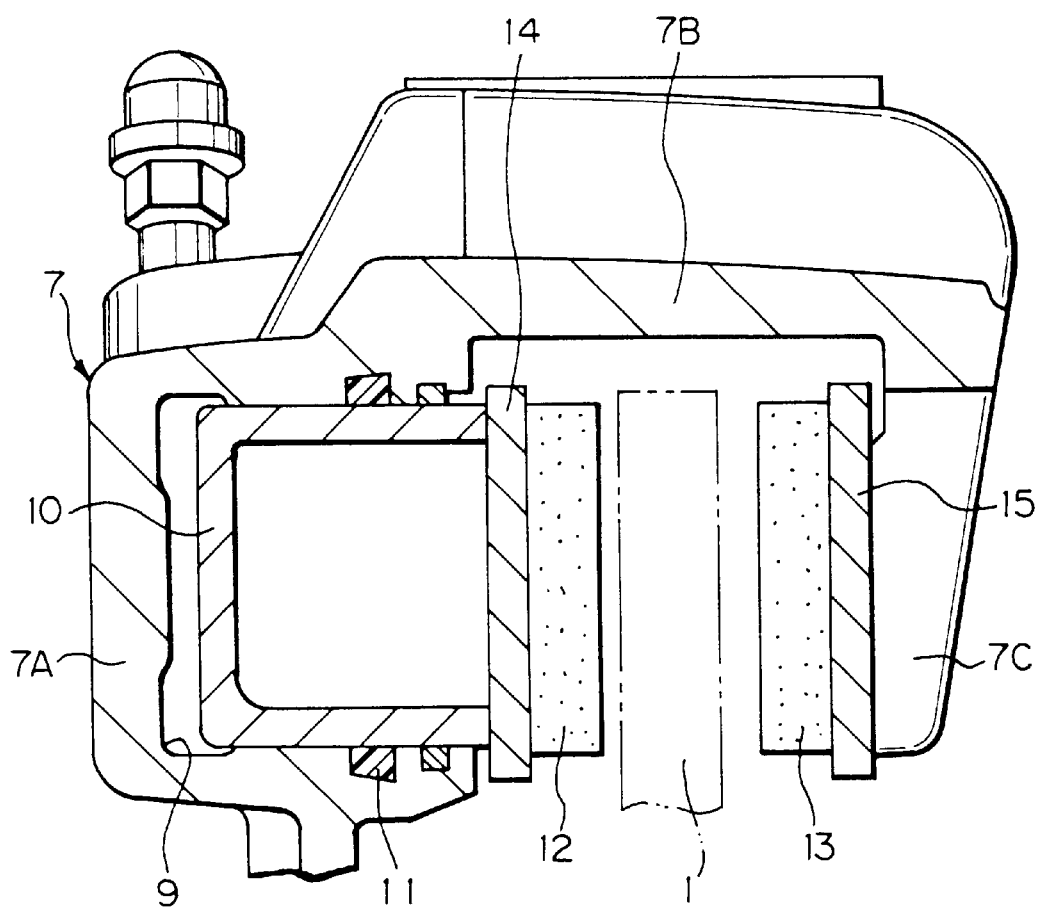
FIG. 3 is a sectional view taken on the line III—III of FIG. 2.

Referring to FIG. 3, an annular piston seal 11 is disposed between the cylinder 9 and the piston 10 and made of rubber or similar material. The piston seal 11 is subjected to elastic deformation as the piston 10 is displaced within the cylinder 9. When a supply of hydraulic fluid is stopped, the piston seal 11 forces the piston 10 into the cylinder due to spring-back.

The inboard friction pad 12 and the outboard friction pad 13 are located at the inboard and outboard sides of the disc 1, respectively. The inboard and outboard friction pads 12, 13 have a sectorial shape and are elongated in a direction transverse to the axis of the disc 1. A corresponding pair of backing plates 14, 15 are secured to the inboard side of the inboard friction pad 12 and the outboard side of the outboard friction pad 13, respectively.

As shown in FIG. 2, the backing plates 14, 15 each include opposite lateral lugs 14A, 15A. The lugs 14A, 15A are fitted into the respective pad guides 3B of the arms 3, 3 through guide regions 19D of the pad springs 19. A projection 16 extends from each of the four lugs 14A, 15A and is crimped to secure one end of each of four wear warning elements 17, 18 which will be described later.

The inboard friction pad 12 is slidably supported on the pad guides 3B through the lugs 14A. Similarly, the outboard friction pad 13 is slidably supported on the pad guides 3B through the lugs 15A while the friction pad 13 is in contact with the outboard leg 7C of the caliper 7. The caliper 7 urges the inboard and outboard friction pads 12, 13 into frictional engagement with opposite sides of the disc 1 to thereby apply a braking force to the disc 1.

A pair of inboard wear warning elements 17, 17 are secured to the respective lugs 14A of the inboard backing plate 14. Similarly, a pair of outboard wear warning elements 18, 18 are secured to the respective lugs 15A of the outboard backing plate 15. As shown in FIGS. 2 and 4, the wear warning elements 17, 18 are made from an elongated metal sheet by means of a punch press.

Specifically, each of the wear warning elements 17 generally includes a flat proximal end 17A, a first bent portion 17B extending axially inwardly from the proximal end 17A and having a U-shape, a second bent portion 17C having one end connected to the first bent portion 17B, extending axially outwardly from the first bent portion 17B and having a U-shape, and a flat distal end or warning portion 17E extending from the other end of the second bent portion 17C, passing between the guide region 19D of the pad spring 19 and the lug 14A, and terminating at a point where the backing plate 14 and the friction pad 12 are joined. The free end of the warning portion 17E serves as a means 17D for detecting undue wear of the friction pad 12. Similarly, the wear warning element 18 includes a flat proximal end 18A, a first bent portion 18B, a second bent portion 18C, and a distal end or wear warning portion 18E with its free end serving as a means 18D for detecting undue wear of the friction pad 13.

The projections 16 are bent or crimped so as to secure the proximal ends 17A, 18A of the wear warning elements 17, 18 to the backing plates 14, 15. When the inboard and outboard friction pads 12, 13 are worn beyond an allowable limit, they are brought into contact with the disc 1. This contact gives a warning sound to the driver Referring to FIGS. 1 and 5, a pair of pad springs 19, 19 are mounted to the respective arms 3, 3. The pad springs 19, 19 are made from a sheet of metal such as stainless steel or similar spring metals by means of a punch press.

Each of the pad springs 19 generally includes a bridge region 19A fitted over the inner side of the arm 3 and bent generally into a V-shape, an engagement region 19B bent rearwardly from the intermediate portion of the bridge region 19A and engageable with one side 3C of the arm 3, a pair of flat regions 19C, 19C depending from opposite ends of the bridge region 19A and extending radially of the disc 1, a pair of guide regions 19D, 19D extending rearwardly from the lower end of the flat regions 19C, 19C and bent generally into a C-shape so that the guide regions 19D, 19D are engaged with the pad guides 3B, 3B of the arm 3, a pair of extension regions 19E, 19E downwardly bent at approximately 90 degrees from the guide regions 19D, 19D, and a pair of pad rest regions 19F, 19F bent at approximately 90 degrees, extending from the lower end of the extension regions 19E, 19E and bent generally into a V-shape so that the pad rest regions 19F, 19F are resiliently in contact with the lower end surface of the friction pads 12, 13.

The engagement region 19B of the pad spring 19 has a pair of opposite protrusions 20, 20. With the 10 protrusions 20, 20 fitted within the disc-passing region 6 of the arm 3, the pad spring 19 is secured to the arm 3 of the carrier 2 so that the centerline of the pad spring 19 is substantially coincide with the centerline A'—A' of the disc-passing region 6 and axially outwardly offset by the distance t from the centerline A—A of the disc 1.

The pad rest regions 19F, 19F of the pad spring 19 are configured to urge the lugs 14A, 15A of the backing plates 14, 15 against the upper surface of the pad guides 3B (or guide regions 19D) so as to axially and slidably guide the friction pads 12, 13.

Figure 5:
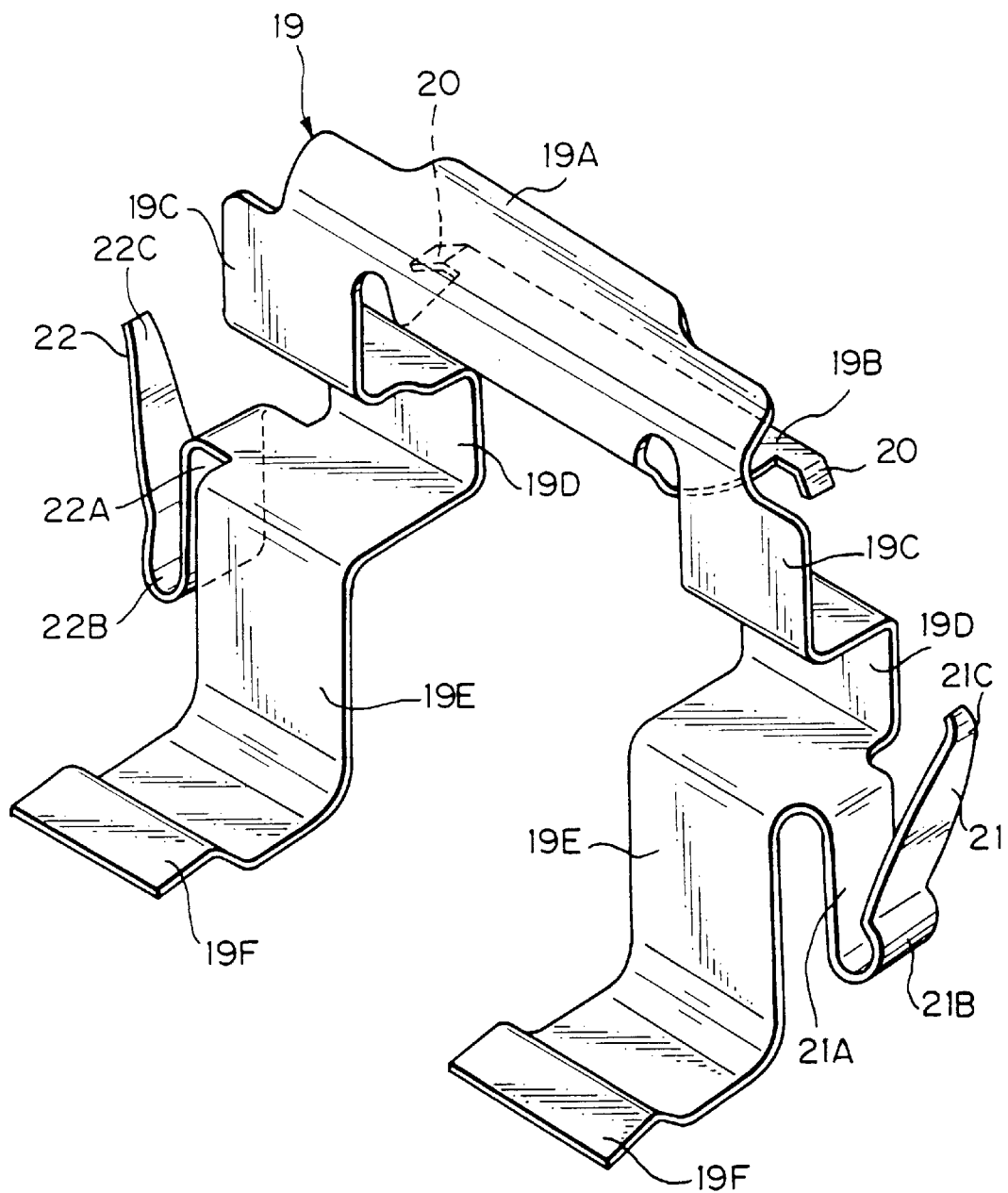
FIG. 5 is a perspective view, on an enlarged scale, of the pad spring shown in FIG. 2.

Referring to FIGS. 4 and 5, a pair of inboard and outboard return springs 21, 22 are integral with the guide regions 19D, 19D of the pad spring 19.

Each of the return springs 21 extends from the guide regions 19D and is bent generally into a V-shape. The return spring 21 includes an engagement region 21A engageable with the inner end of the bearing portion 3A of the arm 3, a bent portion 21B extending from the lower end of the engagement portion 21A and bent generally into a U-shape, and a bias portion 21C inclined upwardly from the bent portion 21B and configured to converge toward its free end.

Similarly, each of the return springs 22 includes an engagement portion 22A, a bent portion 22B, and a bias portion 22C. As shown in section (a) of FIG. 4, the return springs 21, 22 are symmetrical with respect to the centerline A'—A' of the disc-passing region 6 (or pad spring 19) when the brake is unactuated. Accordingly, the distance L between the free end of the bias portion 21C and the centerline A'—A' is identical to the distance L between the free end of the bias portion 22C and the centerline A'—A'.

When the brake is actuated, the friction pads 12, 13 are urged into frictional engagement with opposite sides of the disc 1. At this time, the bent portions 21B, 22B of the return springs 21, 22 are flexed to cause the free ends of the bias portions 21C, 22C to resiliently abut the inner surface of the bent portions 17C, 18C of the wear warning elements 17, 18. Thus, the wear warning elements 17, 18 are constantly urged in opposite directions shown by the arrow F, F' in section (b) of FIG. 4 or in such directions as to separate the inboard and outboard friction pads 12, 13 from the disc 1.

Reference will next be made to the operation of the disc brake thus constructed.

When a pedal brake is depressed by the driver, hydraulic fluid is forced into the cylinder 9. The piston 10 is then moved toward the disc 1 to cause the caliper 7 to slide relative to the carrier 2. As the caliper 7 is moved toward the inboard side of the disc 1, the inboard and outboard friction pads 12, 13 are urged into frictional engagement with opposite sides of the disc 1 so as to impart a braking force thereto (see FIG. 4, (b)).

When the pedal brake is released, the hydraulic fluid is no longer fed to the cylinder 9. The piston 10 is then returned to its initial position under the action of the piston seal 11. This causes the caliper 7 to slide relative to the carrier 2.

The inboard friction pad 12 is free to displace relative to the caliper 7 as the piston 10 is returned. As such, the inboard friction pad 12 can readily be moved back toward the inboard leg 7A and then, separated from the disc as the inboard return springs 21 act to urge the inboard friction pad 12 in a direction shown by the arrow F.

The outboard friction pad 13 is, in turn, urged against the outboard leg 7C under the action of the outboard return springs 22. However, the outboard friction pad 13 can not be fully separated from the disc 1 unless the entire caliper 7 is outwardly moved relative to the carrier after the piston 10 has been returned.

To this end, the centerline A'—A' of the disc-passing regions 6 of the arms 3 is axially outwardly offset by a predetermined distance t from the centerline A—A of the disc 1. Also, the engagement regions 19B of the pad springs 19 are positioned within the disc-passing regions 6 through the protrusions 20 (see FIG. 4, (a)) so that the return springs 21, 22 are laterally symmetrical with respect to the centerline A'—A' of the disc-passing regions 6 (or pad spring 19). Moreover, the free end of the bias portions 21C, 22C is resiliently in contact with the inner surface of the bent portions 17C, 18C of the wear warning elements 17, 18.

By this arrangement, when the inboard and outboard friction pads 12, 14 are urged into frictional engagement with the disc 1 during braking (see FIG. 4, (b)), the wear warning elements 17 can be moved to a position so that the wear warning elements 17 are laterally symmetrical with respect to the centerline A—A of the disc 1. At this time, the distance (M) between the free end of the bent portion 18C and the centerline A—A is equal to the distance (M) between the free end of the bent portion 17C and the centerline A—A. The amount δ' of deformation of the return spring 22 (δ'=L+t−M) becomes greater than the amount δ of deformation of the return spring 21 (δ=L−t−M) by 2t. In other words, the force of the return spring 22 is greater than the force of the return spring 21.

This design is intended to increase the amount of a force applied from the return spring 22 to the wear warning element 18 integral with the friction pad 13 in the direction of the arrow F' and thus, insure separation of the outboard friction pad 13 as well as the inboard friction pad 12 from the disc. The present invention thus prevents the occurrence of "drag", improves fuel economy, and retards immature wear of the friction pads 12, 13. The amount of a resilient force developed by the return spring 22 can be increased without the need to change its shape. Thus, the pad springs 19 as well as the return springs 21, 22 can be symmetrical with respect to the centerline A'—A' and can have an identical shape. This results in a substantial reduction in the number of required parts, the production cost of the overall disc brake, and the number of steps of mounting the pad springs 19. Also, assembly errors of the pad springs 19 can be avoided.

The present invention allows for the use of conventional pad springs. This leads to a substantial reduction in the production cost of the pad springs since there is no need to change the design of such pad springs.

Figure 6:
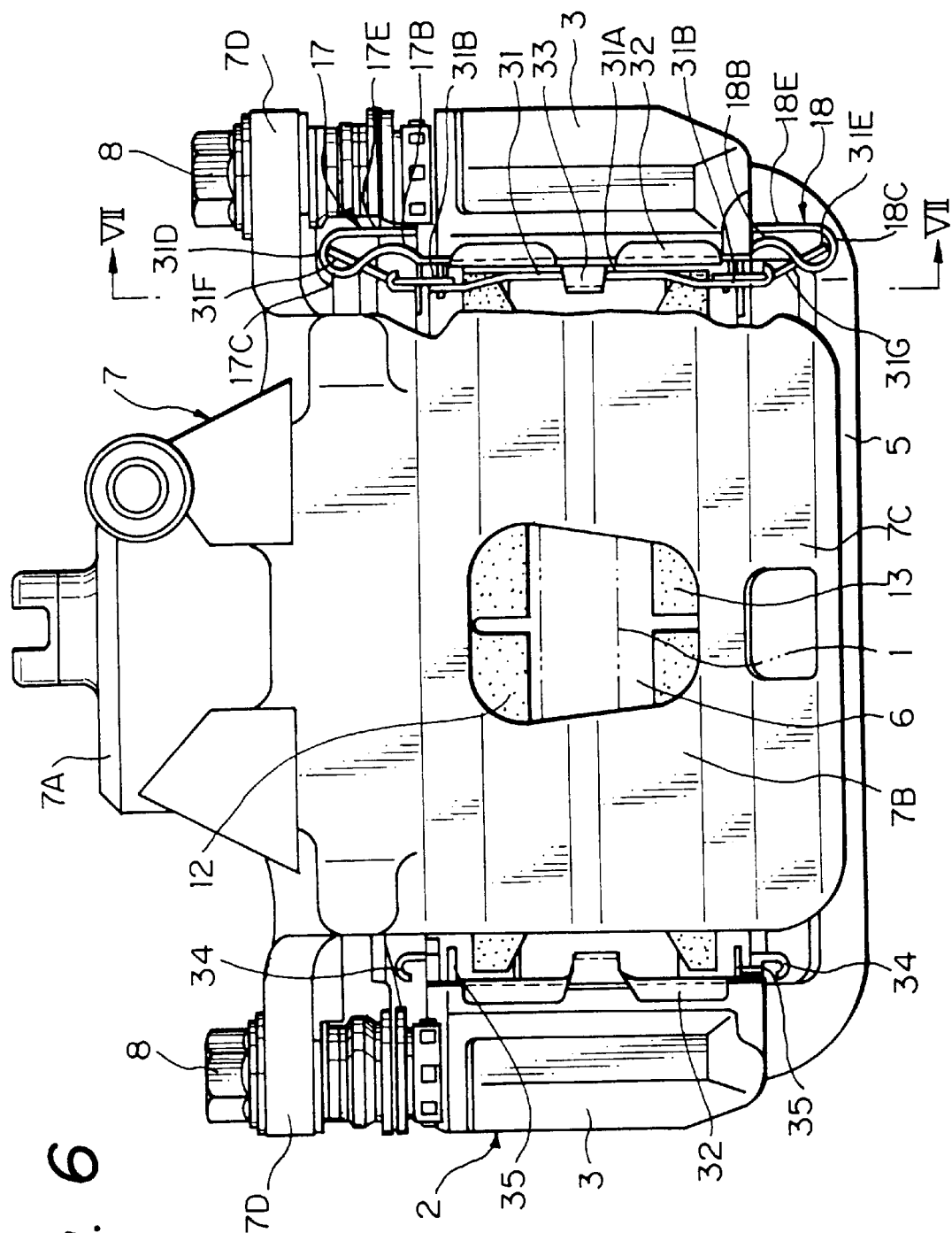
FIG. 6 is a plan view of a disc brake assembled according to a second embodiment of the present invention.
Figure 7:
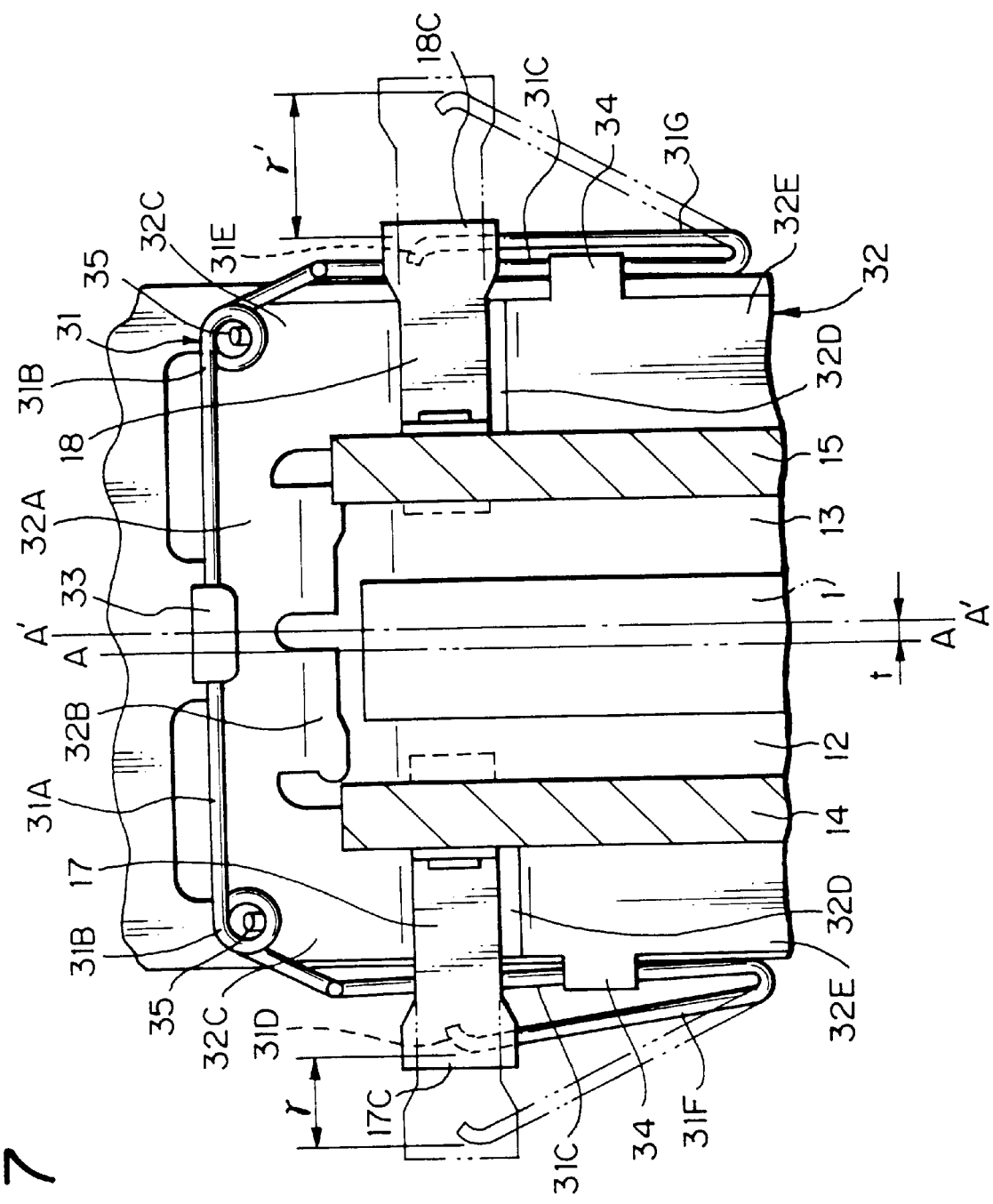
FIG. 7 is an enlarged sectional view taken on the line VII—VII of FIG. 6, illustrating the operation of inboard and outboard friction pads, pad springs, wear warning elements, return springs and other elements.

FIGS. 6 and 7 show a disc brake assembled according to a second embodiment of the present invention. Like elements are given like reference numerals and will not be described herein. As a feature, a pair of discrete springs 31 (only one is shown) are attached to a corresponding pair of pad springs 32. Each of the springs 31 is made by bending a spring wire generally into a C-shape. The spring 31 includes an inboard return spring portion 31F and an outboard return spring portion 31G.

As shown in FIG. 7, the spring 31 includes a substantially straight bridge portion 31A extending along a bridge region 32A of the pad spring 32, a pair of inboard and outboard coil portions 31B, 31B located at opposite ends of the bridge portion 31A, wound by approximately one turn and each having one end bent at an obtuse angle from the bridge portion 31A, a pair of substantially straight inboard and outboard mounting portions 31C, 31C extending along flat regions 32C, guide regions 32D and extension regions 32E of the pad spring 32, and a pair of inboard and outboard return springs portions 31F, 31F bent at an acute angle from the mounting portions 31C, 31C and having at their free end bias portions 31D, 31E which terminate at the wear warning elements 17, 18.

The pad spring 32 is substantially identical in structure to the pad spring 19 of the first embodiment and includes a bridge region 32A, engagement regions 32B, flat regions 32C, guide regions 32D, extension regions 32E and pad rest regions 32F. A hook 33 is formed at the outer edge of the bridge portion 32A and has a U-shaped end. Similarly, a pair of opposite hooks 34, 34 are formed at the outer edge of the extension regions 32E, 32E and have a U-shaped end. A pair of opposite locking elements 35, 35 extend from opposite ends of the bridge region 32A and are spaced in the axial direction of the disc 1.

The spring 31 is positioned relative to the pad spring 32 by engaging the coil portions 31B with the locking elements 35 and engaging the bridge portion 31A and the mounting portions 31C, 31C with the hooks 33, 34. The return springs are laterally symmetrical with respect to the centerline A'—A' of the disc-passing region 6 (or pad spring 32).

As shown in FIG. 7, the amount γ' of deformation of the return spring portion 31G is greater than the amount y of deformation of the return spring portion 31F during braking. By this arrangement, the amount of a force applied from the outboard return spring portion 31G to the outboard wear warning element 18 becomes greater than the amount of a force applied from the inboard return spring portion 31F to the inboard wear warning element 17. This alternative embodiment thus offers the same advantageous effects as the first embodiment does.

In the foregoing embodiments, the disc-passing region 6 is positioned relative to the disc 1 so that the centerline A'—A' of the disc-passing region 6 is axially outwardly offset from the centerline A—A of the disc 1. Alternatively, the carrier 2 may be positioned relative to the fixed part of the vehicle so that the entire arm 3 is offset outwardly from the disc 1, or the disc 1 is inwardly offset from the centerline of the disc brake.

Also, in the foregoing embodiments, the return springs 21, 22 (or 31F, 31G) are connected to the both pad springs 19, 19 (or 32, 32). The present invention is not limited thereto. For example, the return springs may be connected to only one of the pad springs.

Illustratively, the present invention is applied to an automotive vehicle, but may be equally applied to a bicycle, a two-wheeled motor cycle or other motor cycles.

Although the present invention has been described with respect to its preferred embodiments, various modifications may be made without departing from the scope of the invention as defined by the appended claims.

What is claimed is:

1. A disc brake comprising:

a carrier including a pair of axial arms spaced along a circumference of a disc and extending over an outer periphery of the disc, said pair of arms having respective disc-passing regions;

a caliper slidably supported on said pair of arms and configured to straddle the disc between said pair of arms, said caliper including a cylinder within which a piston is slidably disposed;

a pair of inboard and outboard friction pads which are so positioned that they are urged into frictional engagement with opposite sides of the disc when said piston extends from the cylinder; and inboard and outboard return springs mounted on said carrier and adapted to urge said pair of inboard and outboard friction pads in directions away from the disc, wherein said inboard and outboard return springs are arranged to have a centerline with respect to which they are symmetrical and the centerline is axially outwardly offset by a predetermined distance from the disc whereby said outboard return spring exerts on the outboard friction pad a first force which is greater than a second force applied from said inboard return spring to said inboard friction pad.

2. A disc brake according to claim 1 further comprising a pad spring having a portion for guiding said friction pads, said inboard and outboard return springs being integral parts of said pad spring.

3. A disc brake according to claim 2, wherein said pad spring has a centerline with respect to which the pad spring is symmetrical and the centerline is axially outwardly offset from said disc.

4. A disc brake according to claim 3, wherein said disc-passing regions have a centerline with respect to the axial direction and the centerline is substantially coincident with said centerline of said pad spring.

5. A disc brake according to claim 1 further comprising a pad spring having a portion for guiding said friction pads, said inboard and outboard return springs being portions of a spring wire attached to said pad spring.

6. A disc brake according to claim 5, wherein said spring wire has a centerline with respect to which the spring wire is symmetrical and the centerline is axially outwardly offset from said disc.

* * * * *

UNITED STATES PATENT AND TRADEMARK OFFICE
CERTIFICATE OF CORRECTION

PATENT NO. : 5,934,417
DATED : August 10, 1999
INVENTOR(S) : Kobayashi, et al

It is certified that error appears in the above-identified patent and that said Letters Patent is hereby corrected as shown below:

On the title page, item [73] Assignee: should read
-- Tokico, Ltd., Kawasaki; Nissan Motor Co., Ltd., Yokohama, both of Japan --

Signed and Sealed this

Fourth Day of April, 2000

Q. TODD DICKINSON

*Attest:*

*Attesting Officer*

*Director of Patents and Trademarks*